United States Patent
Shah

(10) Patent No.: US 8,951,327 B2
(45) Date of Patent: *Feb. 10, 2015

(54) FERTILIZER COMPOSITION

(76) Inventor: Deepak Pranjivandas Shah, Mumbai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/003,239

(22) PCT Filed: Mar. 12, 2012

(86) PCT No.: PCT/IN2012/000168
§ 371 (c)(1),
(2), (4) Date: Oct. 7, 2013

(87) PCT Pub. No.: WO2012/131702
PCT Pub. Date: Oct. 4, 2012

(65) Prior Publication Data
US 2014/0060131 A1    Mar. 6, 2014

(30) Foreign Application Priority Data

Mar. 10, 2011  (IN) .................. 663/MUM/2011
Mar. 7, 2012   (IN) .................. 616/MUM/2012

(51) Int. Cl.
*C05D 9/02*   (2006.01)
*C05D 5/00*   (2006.01)
*C05G 3/00*   (2006.01)
*C05G 3/06*   (2006.01)

(52) U.S. Cl.
CPC .. *C05D 5/00* (2013.01); *C05D 9/02* (2013.01); *C05G 3/007* (2013.01); *C05G 3/06* (2013.01)
USPC .............................................. 71/63

(58) Field of Classification Search
USPC ....................................... 71/11–63
See application file for complete search history.

(56) References Cited

U.S. PATENT DOCUMENTS

| | | | | |
|---|---|---|---|---|
| 3,560,192 | A * | 2/1971 | Di Cicco | 71/51 |
| 4,210,437 | A * | 7/1980 | Windgassen et al. | 71/28 |
| 4,427,719 | A * | 1/1984 | Moore | 427/205 |
| 5,435,822 | A | 7/1995 | Blouin | |
| 6,749,659 | B1 * | 6/2004 | Yu et al. | 71/28 |
| 2004/0009878 | A1 | 1/2004 | Lynch et al. | |
| 2007/0119222 | A1 * | 5/2007 | Valencia et al. | 71/52 |
| 2007/0180877 | A1 * | 8/2007 | Anderson et al. | 71/31 |
| 2009/0038355 | A1 * | 2/2009 | Marks | 71/27 |
| 2010/0154498 | A1 * | 6/2010 | Valencia | 71/23 |

FOREIGN PATENT DOCUMENTS

WO    2008/084495 A2    7/2008

* cited by examiner

*Primary Examiner* — Wayne Langel
(74) *Attorney, Agent, or Firm* — Wiley Rein LLP

(57) ABSTRACT

The present invention relates to compositions comprising an effective amount of sulphur, an effective amount of zinc sulphate or zinc oxide and at least one agrochemically acceptable excipient.

13 Claims, 4 Drawing Sheets

405    410    415

FERTILIZER COMPOSITION

BACKGROUND OF THE INVENTION

1. Field of the Invention

The present invention relates to compositions comprising an effective amount of sulphur; an effective amount of zinc sulphate or zinc oxide and at least one agrochemically acceptable excipient. The invention further relates to a method of application of the compositions to crops.

2. Description of the Related Art

The role of sulphur as an essential and a growing nutrient and fertilizer has been long known. Sulphur deficiency has become widespread over the past several decades in most of the agricultural areas of the world, resulting in sulphur being indicated as a limiting factor to high yields and fertilizer efficiency.

The role of zinc as a micronutrient has also been known. The role of zinc and its association with Khaira disease in particular, in paddy (rice) cultivated soils at large is well known. When a plant has an inadequate supply of zinc, the biochemical functions become impaired and thus the health and growth of the plants are adversely affected resulting in lower yield or even crop failure and poorer crop quality.

According to W.H.O close to fifty percent of world cereal soils are deficient in zinc and it is estimated that one third of world's population is at risk of zinc deficiency which can lead to health problems including poor immune response and impaired growth and development. Globally, zinc deficiency ranks eleventh among twenty risk factors. W.H.O attributes 8,00,000 deaths world wide each year due to zinc deficiency. Therefore, improving zinc nutrients status of food crops becomes a priority for fighting malnutrition in humans and animals.

When commercially available zinc and sulphur fertilisers are applied to the crops, these fertilisers are required in large doses, as the nutrients are not available immediately for plant uptake. Also, since these nutrients are not readily available for plant uptake due to their formulations, these fertilisers are also leached, washed away and wasted. No suitable fertilizer composition comprising both sulphur and zinc are known or available which can be effectively used in micro irrigation systems to meet the requirements of the plants.

Furthermore, granular sulphur and zinc fertilizers such as sulphur and zinc oxide, for instance, which are formulated with certain excipients, for example, bentonite, are not water dispersible. These conventional sulphur and zinc fertilizers swell and block micro irrigation systems or nozzles during the application. Hence, they cannot be effectively used in drip irrigation, which is also becoming more essential as labour shortage increases and water becomes a scarce resource. Furthermore, such fertilizers are in the form of prills or pellets or pastilles, and are also applied at much higher dosages to achieve desired levels of nutrition. This presents a great challenge to the user and to the environment.

Hence, there is a need to develop a composition, which provides sulphur and zinc to the soil in a timely manner as per the physiological needs of the plant, is water dispersible and can be efficiently used in micro irrigation systems, is user friendly, enhances yields, optimizes the uses of zinc and sulphur while reducing the cost of application and is yet used in lower quantities, thus minimizing any residues and overcomes the drawbacks presented by the prior art.

SUMMARY OF THE INVENTION

Surprisingly, the inventors have determined that a fertilizer composition comprising an effective amount of sulphur, an effective amount of zinc oxide and at least one agrochemically acceptable excipient, having a particle size in the range of 0.1 microns to 50 microns, provides a higher yield in various crops and improves plant physiology and can be readily used in micro irrigation systems.

Also, surprisingly the inventors have discovered that a water dispersible granular composition comprising an effective amount of sulphur, an effective amount of zinc sulphate monohydrate, and at least one agrochemically acceptable excipient provides a higher yield in various crops and improves plant physiology. Furthermore, the composition demonstrates excellent dispersion and can be readily used in micro irrigation systems.

Also, surprisingly, the inventors of the application have also discovered that the fertilizer composition comprising an effective amount of sulphur, an effective amount of zinc sulphate or zinc oxide, and at least one agrochemically acceptable excipient can be in the form of suspension concentrate which demonstrated a high yield in certain crops and also finds a direct use in micro irrigation systems.

Quite advantageously, the compositions can be applied as a foliar spray or to the soil, through broadcasting or through drip or trickle irrigation. Thus, the compositions of the invention can be used in all possible ways of application, as per the convenience of the user. The latter case of drip or trickle irrigation further optimizes farming practices, which are greatly challenged by an ever-increasing labour and water shortage.

BRIEF DESCRIPTION OF THE DRAWINGS

For a more complete understanding of the invention reference should now be made to the embodiments illustrated in greater detail in the accompanying drawings and described by way of embodiments of the invention.

DETAILED DESCRIPTION

In describing the embodiments of the invention, specific terminology is resorted for the sake of clarity. However, it is not intended that the invention be limited to the specific terms so selected and it is to be understood that each specific term includes all technical equivalents that operate in a similar manner to accomplish a similar purpose.

Water dispersible granules can be defined as a formulation consisting of granules to be applied after disintegration and dispersion in water. As described herein, "WG" or "WDG" refer to water dispersible granules Suspension concentrate can be defined as a stable suspension of fertilizer in a fluid usually intended for dilution with water before use. As described herein, "SC" refers to suspension concentrates.

The invention further relates to a fertilizer composition comprising an effective amount of sulphur, an effective amount of zinc oxide and at least one agrochemically acceptable excipient, wherein the particle size is in the range of 0.1 microns to 50 microns.

According to an embodiment, sulphur is present in the range of 30% to 87% of the total composition. Preferably, sulphur is present in the range from 40% to 75% of the total composition. According to an embodiment, zinc oxide is present in the range of 3% to 25% of the total composition. Preferably, zinc oxide is present in the range from 7.5% to 20% of the total composition.

As is known, commercially pure zinc oxide contains about 80% zinc metal.

According to an embodiment, the particle size of zinc oxide is in the range of 100 nm to 1 micron. Preferably, in most cases, the average particle size of zinc oxide will be in the range of 500 nm to 1 micron. According to another embodiment, the particle size of sulphur is in the range of 0.2 microns to 50 microns. According to another embodiment, the average particle size of the total composition is in the range of 100 nm to 50 microns, preferably in the range of 100 nm to 10 microns.

As is known, 1 micron is equivalent of 1000 nm. The inventors have enabled one 5 micron particle, when reduced further to 0.5 micron, will produce 1000 particle of 0.5 microns from the single 5 micron particle.

According to an embodiment, the composition comprising sulphur, zinc oxide and an agrochemically acceptable excipient is in the form of microgranules in the size range of 0.1 mm to 0.5 mm, wherein the microgranules comprise particles in the size range of 0.1 microns to 50 microns, preferably 0.1 microns to 10 microns.

Figure 4:
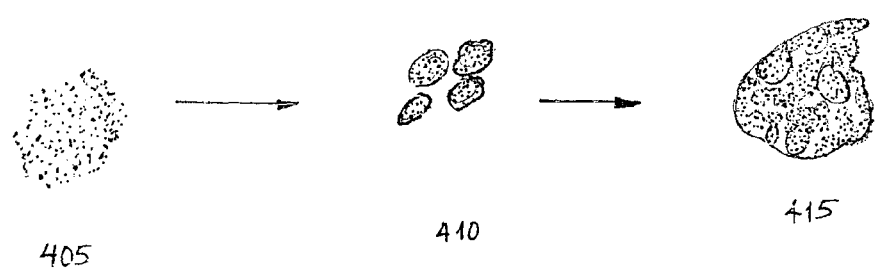
FIG. 4 illustrates formation of microgranules and broadcast granules from individual particles in accordance with an embodiment of the invention.

According to an embodiment, as seen in FIG. 4, microgranules (410) of the size of 0.1 mm to 0.5 mm are formed from individual particles (405) in the size range of 0.1 microns to 50 microns, (preferably 0.1 microns to 10 microns), by agglomerating several thousand individual particles to form the microgranules (410).

According to another embodiment, the composition comprising sulphur, zinc oxide and an agrochemical excipient is in the form of broadcast granules in the size range of 0.75 mm to 5 mm, wherein the broadcast granules comprise particles in the size range of 0.1 microns to 50 microns, preferably 0.1 microns to 10 microns.

According to another embodiment, as seen in FIG. 4, several microgranules (410) of the size range of 0.1 mm to 0.5 mm are agglomerated to form broadcast granules (415) in the size range 0.75 mm to 5 mm having particles in the size range of 0.1 microns to 50 microns (preferably 0.1 microns to 10 microns).

Preferably, the composition comprising sulphur and zinc oxide is applied to the soil in the form of broadcast granules or to the crops as a foliar spray or in micro-irrigation systems such as drip or trickle or sprinkler irrigation systems.

The present invention relates to a water dispersible granular composition comprising an effective amount of sulphur, an effective amount of zinc sulphate monohydrate and at least one agrochemically acceptable excipient.

According to an embodiment, sulphur is present in a range from 30% to 85% of the total granular composition. Preferably, sulphur is present in the range from 30% to 65% of the total granular composition. According to an embodiment the zinc sulphate monohydrate is present in a range from 8% to 60% of the total granular composition. Preferably, zinc sulphate monohydrate is present in the range from 20% to 40% of the total granular composition.

As is known, commercially pure zinc sulphate monohydrate contains approximately 33%-35% zinc metal.

According to an embodiment, the composition further comprises a micronutrient present in the range from 5% to 25% of the total granular composition.

According to an embodiment, the micronutrient is selected from group comprising of magnesium sulphate or manganese sulphate or combination thereof.

According to an embodiment, the particle size is in the range from 0.2 micron to 50 micron. Preferably the particle size is in the range of 0.2 micron to 10 micron.

According to an embodiment, the composition can also be in the form of microgranules, wherein the microgranules are in the size range of 0.1 mm to 0.5 mm, comprising particles in the size range of 0.2 to 50 micron. Preferably, the microgranules in the size range of 0.1 mm to 0.5 mm, comprising particles in the size range of 0.2 microns to 10 microns.

According to an embodiment, the composition is in the form of broadcast granules, wherein the broadcast granules are in the size range of 0.75 mm to 5 mm, comprising particles in the size range of 0.2 to 50 micron. Preferably, broadcast granules in the size range of 0.75 mm to 5 mm comprising particles in the size range of 0.2 microns to 10 microns.

According to an embodiment, when the composition is in the form of water dispersible granules, microgranules or broadcast granules, the dispersibility is greater than 80%. Preferably, the dispersibility of the composition is greater than 90%.

According to an embodiment, the invention further relates to a method of application of the composition, wherein the composition is applied through a micro irrigation system such as drip or trickle or sprinkler irrigation.

The invention further relates to a fertilizer composition comprising an effective amount of sulphur, an effective amount of zinc sulphate or zinc oxide and at least one agrochemically acceptable excipient in the form of a suspension concentrate.

According to an embodiment, when the composition is in the form of suspension concentrate, sulphur is present in the range of 10% to 60% and zinc sulphate is present in the range of 5% to 25% of the total composition. According to another embodiment, the suspension concentrate composition comprises sulphur in the range of 15% to 50% and zinc oxide in the range of 3% to 25% of the total composition.

According to an embodiment, when the suspension concentrate composition comprises zinc sulphate, the particle size is in the range from 0.2 micron to 50 micron. Preferably, the particle size is in the range of 0.6 micron to 8 micron.

According to an embodiment, when the suspension concentrate composition comprises zinc oxide, the particle size is in the range of 0.1 micron to 50 microns. Preferably, the particle size is in the range of 0.1 microns to 8 microns.

According to an embodiment, when the composition is in the form of suspension concentrate, the suspensibility is greater than 80%. Preferably, the suspensibility of the composition is greater than 90%.

According to an embodiment, the agrochemical excipient can include one or more surfactants or fillers. However, those skilled in the art will appreciate that it is possible to utilize additional agrochemically acceptable excipients without departing from the scope of the present invention. The agrochemically acceptable excipient is in the range from 3% to 65% of the total weight of the composition.

Surfactants which can be commonly used include sulfosuccinates, naphthalene sulfonates, sulfated esters, phosphate esters, sulfated alcohol; alkyl benzene sulfonates polycarboxylates, naphthalene sulfonate condensates, phenol sulfonic acid condensates, lignosulfonates, methyl oleyl taurates and polyvinyl alcohols. However, those skilled in the art will appreciate that it is possible to utilize other surfactants known in the art without departing from the scope of the invention.

Fillers which can optionally be used include diatomaceous earth, kaolin, precipitated silica, attapulgite, and perlite. In most cases the compositions can be enabled without the use of fillers. However, those skilled in the art will appreciate that it is possible to utilize other fillers known in the art without departing from the scope of the invention.

Figure 1:
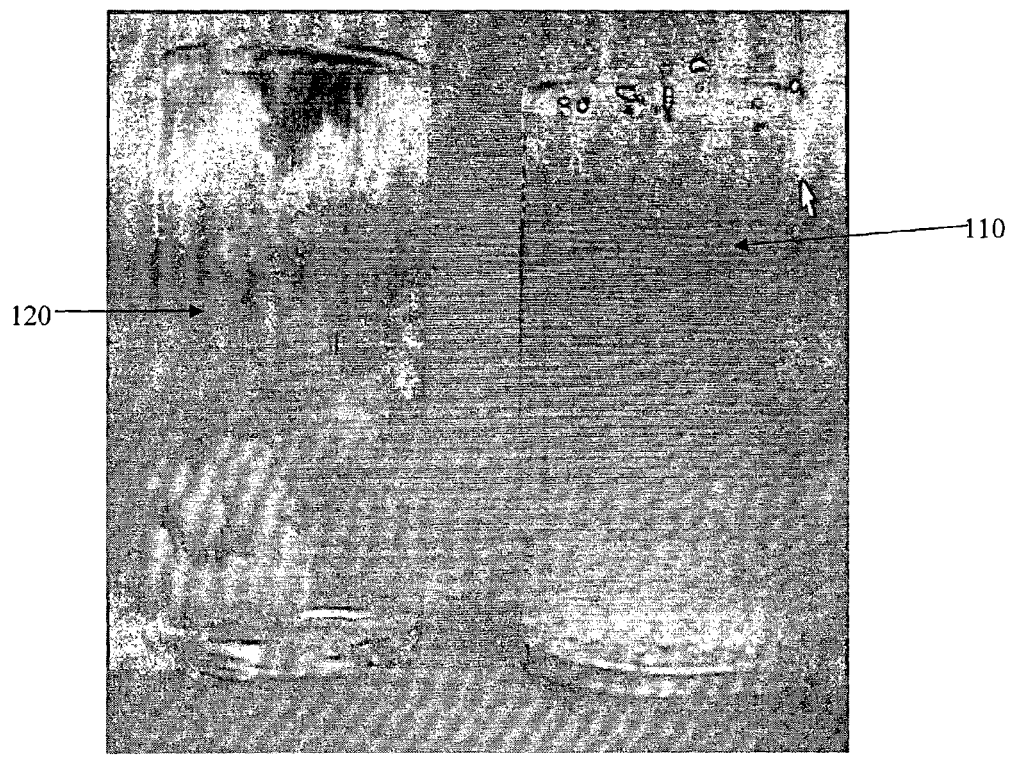
FIG. 1 illustrates a comparison of the dispersibility of the prior art fertilizer composition (110) and a composition in accordance with an embodiment of the invention (120) at zero time.

According to an embodiment FIG. 1 illustrates the comparison of the dispersibility of the prior art fertilizer composition (110) comprising sulphur 65%+Zinc Oxide 18% pastilles and the composition in accordance with an embodiment of the present invention (120) comprising Sulphur 60%+Zinc Oxide 20% WG having an average particle size less than 1.1 micron at time zero. The composition (120) disperses immediately on addition to water and demonstrates a cloud formation. It is observed that each and every individual particle in the composition according to the embodiment, is getting dispersed thoroughly. As seen from the figure, the prior art fertilizer composition (110) does not disperse when added to water and settles at the bottom of the beaker.

Figure 2:
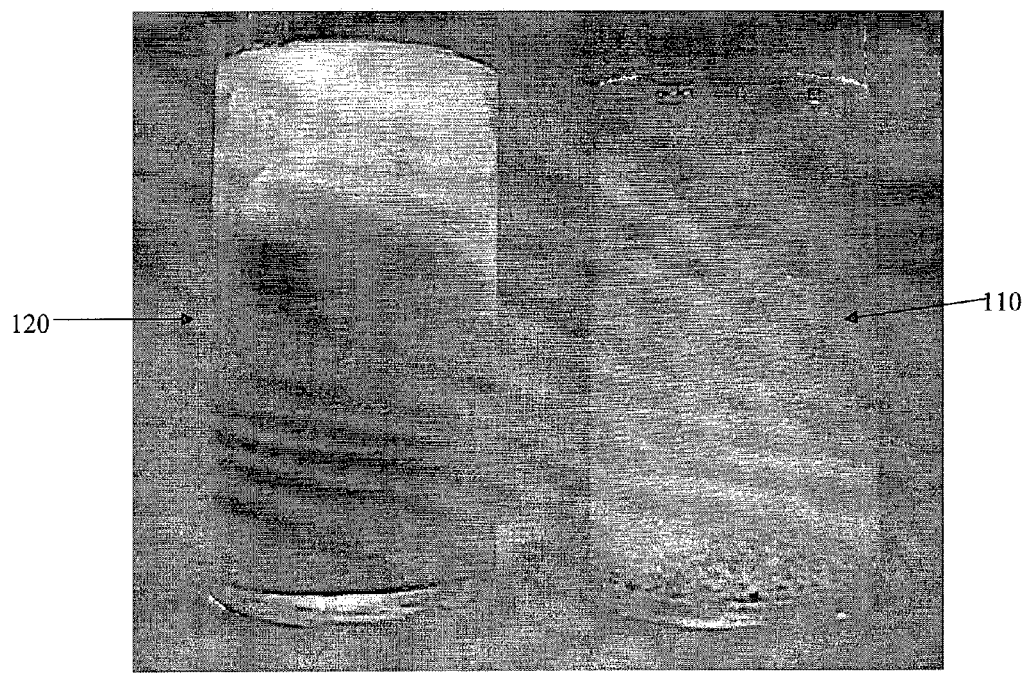
FIG. 2 illustrates a comparison of the dispersibility of the prior art fertilizer composition (110) and a composition in accordance with an embodiment of the invention (120) after 30 minutes.

FIG. 2 illustrates a comparison of the dispersibility of the prior art fertilizer composition (110) and the composition in accordance with an embodiment of the present invention (120) after 30 minutes.

Figure 3:
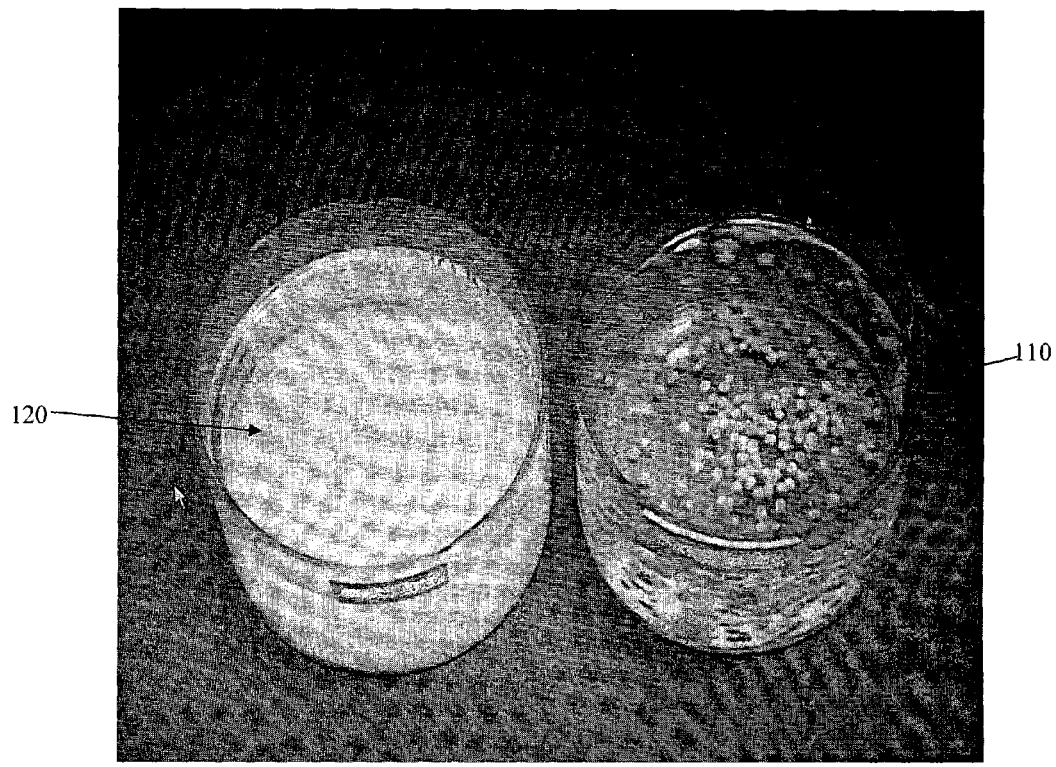
FIG. 3 illustrates a top view of a comparison of the dispersibility of the prior art fertilizer composition (110) and a composition in accordance with an embodiment of the invention (120) after 30 minutes.

According to an embodiment FIG. 3 illustrates a top view of a comparison of the dispersibility of the prior art fertilizer composition (110) and the composition in accordance with an embodiment of the present invention (120) after 30 minutes.

The prior art fertilizer composition (110) does not disperse even after 30 minutes and thus it cannot be effectively used in micro irrigation systems as well as foliar applications. This poses a great challenge to the end user. The composition (120) in accordance with an embodiment of the present invention remains uniformly suspended in water over an extended period of time showing a full bloomed dispersion. The composition according to the embodiment can be used effectively and efficiently in foliar applications and micro irrigation systems such as trickle, drip or sprinkler irrigation.

Water dispersible granule compositions or fertilizer compositions can be made by various processes such as spray drying, fluid bed spray drying, extrusion, pan granulation, etc. One way of making water dispersible granular compositions which include sulphur and zinc sulphate involves initially blending required additives such as surfactants, fillers to obtain an additive mix. The above mixture is wet milled using a bead mill to obtain an average particle size of less than 50 microns, preferably less than 15 microns, preferably 0.2 to 10 microns to obtain the mill base. The mill base is granulated in an appropriate spray drier or other drying methods with an outlet of a suitable temperature followed by sieving to remove the under sized and oversized granules, to obtain a WG formulation comprising sulphur and zinc sulphate in combination. A fertilizer composition comprising sulphur and zinc oxide can also be prepared in a manner described above.

The suspension concentrate composition can be prepared by various processes. One way of making suspension concentrate which include sulphur and zinc sulphate involves initially blending of required additives such as surfactants, fillers to obtain an additive mix Then a mill base having an average particle size of less than 50 microns, preferably less than 15 microns, preferably 0.6 to 8 microns is prepared by milling a mixture of requisite amount of the zinc sulphate and sulphur in appropriate ratios in additive mix in required amount of water. Further, sufficient quantity of water with required amounts of binders and preservatives is added to the mill base and mixed thoroughly to get the SC formulations of the desired combination of sulphur and zinc sulphate. The compositions for sulphur and zinc oxide in the form of a suspension concentrate are also made in a similar manner described above.

According to an embodiment, the invention relates to a method of application of an effective amount of the compositions, wherein the composition is applied to crops through foliar spray or soil application or through drip irrigation or trickle irrigation. Preferably the composition is applied as a soil application, for example, broadcast granules. More preferably the composition is applied through various micro irrigation systems such as drip, trickle or sprinkler irrigation.

The compositions which are readily dispersible display excellent synergy and are highly safe to the user and to the environment. The compositions are also cost-effective, as they provide much greater simultaneous nutrient uptake and can be used in a variety of crops with an improved and healthy foliage, improved crop yield, better crop quality. The compositions can be used at a much lower dosage than conventional fertilizers. The compositions also enable an efficient delivery of the nutrients at a desired time of application in a plant physiological life cycle. One of the major advantages of the composition is the applications in micro irrigation system such as drip, trickle or sprinkler irrigation. It was observed that when the compositions are used in micro irrigation system there is reduction of at least about 25% to 50% dosage as compared to conventional fertilizers. The other advantages include reduction in the costs from water, energy, labour, chemical sources and additional input cost. The composition of the present invention improves plant vigor by delivering water and nutrients directly to the plant roots and rhizosphere in controlled quantities thereby preventing unnecessary flooding of plants and also avoids unnecessary weed population. The compositions also enables farmer to address deficiency of sulphur and zinc in various soil. The resulting crop is of improved quality with an ability to achieve optimum growth and high yield.

EXAMPLES

Example 1

Sulphur 30%+Zinc Sulphate 33% WG

Step 1: Preparation of 'Additive Mix'

Sulphur (30%), Zinc sulphate monohydrate (33%) Naphthalene sulfonate condensate (Tammol DN) (4%) Lignin sulfonate (Reax 100) (18%), and Kaolin (Barden Clay) (5%) are mixed together.

Step 2: Preparation of Mill Base

The above mixture is wet milled using a bead mill to obtain an average particle size to get the mill base.

Step 3: Spray Granulation of Mill Base

The above mill base is spray granulated in a spray drier at an appropriate out let temperature followed by sieving to remove the under sized and oversized granules to get water dispersible granules of Sulphur (30%)+Zinc sulphate (33%).

Example 2

Sulphur 30%+Zinc Sulphate 50%+Magnesium Sulphate 10% WG

The mill base is prepared by milling a mixture of Sulphur (30%), Zinc sulphate monohydrate (50%) and Magnesium sulphate monohydrate (10%) Naphthalene sulfonate condensate (Tammol DN) (4%) Lignin sulfonate (Reax 100) (5%), and Napthalene sulfonate (1%) and the mixture is spray granulated as in Example 1 to get water dispersible granules of Sulphur 30%+Zinc Sulphate 50%+Magnesium sulphate 10%.

Example 3

Sulphur 30%+Zinc Sulphate 55%+Manganese Sulphate 11% WG

The mill base is prepared by milling a mixture of Sulphur (30%), Zinc sulphate monohydrate (55%) and Manganese sulphate monohydrate (11%) Naphthalene sulfonate condensate (Tammol DN) (1.6%), Lignin sulfonate (Reax 100) (1%) and Napthalene sulfonate (0.5%) and is spray granulated as in Example 1 to get water dispersible granules of Sulphur 30%+Zinc Sulphate 55%+Manganese sulphate 11%.

Example 4

Sulphur 40%+Zinc Sulphate 5% SC

Mill base, having an average particle size of around 0.2 to 5 microns, is prepared as in Example 1 by milling a mixture of 11.5 parts of Zinc sulphate monohydrate (95% purity), 41.5 parts of sulphur technical (99% purity), Naphthalene sulfonate condensate—sodium salt (2%), Phenol sulfonate condensate—sodium salt (2%), Lignin sulfonate—sodium salt (2%) in 28 parts of water containing 5 parts of propylene glycol. 8.5 parts of 2% dispersion of xanthum gum (e.g., Rhodopol) in water containing 0.5% 1,2-Benzisothiazolin-3-one (eg. Proxel) is then added to the mill base and mixed thoroughly to get Sulphur 40%+Zinc Sulphate 5% SC.

Example 5

Sulphur 10%+Zinc Sulphate 25% SC

Mill base, having an average particle size of around 0.2 to 5 microns, is prepared as in Example 1 by milling a mixture 26.5 parts of Zinc sulphate monohydrate (95% purity), 10.5 parts of sulphur technical (99% purity), Naphthalene sulfonate condensate—sodium salt (2%), Phenol sulfonate condensate—sodium salt (2%), Lignin sulfonate—sodium salt (2%) in 40 parts of water containing 5 parts of propylene glycol. 12 parts of 2% dispersion of xanthum gum (eg. Rhodopol) in water containing 0.5% 1,2-Benzisothiazolin-3-one (eg. Proxel) is then added to the mill base and mixed thoroughly to get Sulphur 10%+Zinc Sulphate 25% SC.

Example 6

Sulphur 60%+Zinc Oxide 20% WG

Mill base is prepared as in Example 1 by milling a mixture 21 parts of Zinc Oxide (95% purity), 61 parts of sulphur technical (99% purity), Naphthalene sulfonate condensate (Tammol DN) (4%), Lignin sulfonate (Reax 100) (8%) in water containing 0.5% 1,2-Benzisothiazolin-3-one (eg. Proxel) is then added to the mill base and mixed thoroughly to get Sulphur 60%+Zinc Oxide 20% WG.

Example 7

Sulphur 30%+Zinc Oxide 10% SC

Mill base, having an average particle size of around 0.2 to 5 microns, is prepared as in Example 1 by milling a mixture 11 parts of Zinc Oxide (95% purity), 30.5 parts of sulphur technical (99% purity), Naphthalene sulfonate condensate—sodium salt (2%), Phenol sulfonate condensate (Tammol DN) (4%), Lignin sulfonate (Reax 100) (2%) in 36.5 parts of water containing 5 parts of propylene glycol. 10 parts of 2% dispersion of xanthum gum (eg. Rhodopol) in water containing 0.5% 1,2-Benzisothiazolin-3-one (eg. Proxel) is then added to the mill base and mixed thoroughly to get Sulphur 30%+Zinc Oxide 10% SC.

Efficacy Trial

The efficacy trials conducted using stand-alone treatments of sulphur and zinc sulphate and sulphur and zinc oxide was done in accordance with the standard recommended dosages for these active ingredients in India. However, it may be noted that the recommended dosages for each active ingredient may vary as per recommendations in a particular country, soil conditions, the cultivars, weather conditions, pest and disease incidence etc.

Example 1

The trials were conducted in Indore district of Madhya Pradesh state in India on Sandy loam soils on soybean crop. The experiments were conducted using Sulphur 90% WG standalone and Zinc Sulphate 33% standalone used as standards for comparison as well as an untreated control. The treatments were replicated three times in a randomized complete block design on a plot size of 25 m2 and keeping all the agronomic practices uniform for all the treatments.

It is to be noted that all the foliar sprays were conducted after 20 days of sowing soyabean crop and the irrigation was applied uniformly.

The treatments applied were as indicated in the table below:

TABLE 1

| Treatment | Compositions | Active ingredients (grams/hectare) | Formulation dosage in gm/ha | Mean yield/ hectare (kg/ha) |
|---|---|---|---|---|
| 1 | Sulphur 30% + ZnSO$_4$ 60% WG | 3000 + 1980 | 10000 | 990 |
| 2 | Sulphur 85% + ZnSO$_4$ 10% WG | 8500 + 330 | 10000 | 988 |
| 3 | Sulphur 55% + ZnSO$_4$ 30% WG | 5500 + 990 | 10000 | 1001 |
| 4 | Sulphur 30% + ZnSO$_4$ 50% + MgSO$_4$ 15% WG | 3000 + 1650 + 450 | 10000 | 970 |
| 5 | Sulphur 80% + ZnSO$_4$ + MgSO$_4$ 5% WG | 8000 + 330 + 150 | 10000 | 972 |
| 6 | Sulphur 50% + ZnSO$_4$ 20% + MgSO$_4$ 25% WG | 5000 + 660 + 750 | 10000 | 998 |
| 7 | Sulphur 60% + ZnO 20% WG (average particle size less than 1.1 micron) | 6000 + 1600 | 10000 | 982 |

TABLE 1-continued

| Treatment | Compositions | Active ingredients (grams/hectare) | Formulation dosage in gm/ha | Mean yield/hectare (kg/ha) |
|---|---|---|---|---|
| 8 | Sulphur 30% + ZnO 10% SC (average particle size in the range of 0.1 microns to 5 microns) | 3000 + 800 | 10000 | 978 |
| 9 | Sulphur 30% + $ZnSO_4$ 50% + $MnSO_4$ 15% WG | 3000 + 1650 + 450 | 10000 | 997 |
| 10 | Sulphur 80% + $ZnSO_4$ 10% + $MnSO_4$ 5% WG | 8000 + 330 + 150 | 10000 | 987 |
| 11 | Sulphur 50% + $ZnSO_4$ 20% + $MnSO_4$ 25% WG | 5000 + 660 + 750 | 10000 | 1000 |
| 12 | Sulphur 30% + $ZnSO_4$ 25% SC | 3000 + 825 | 10000 | 980 |
| 13 | Sulphur 90% WG | 6750 | 7500 | 950 |
| 14 | $ZnSO_4$ 33% Powder | 4125 | 12500 | 926 |
| 15 | Sulphur 65% + ZnO 18% pastilles (Prior art) | 13000 + 2880 | 20000 | 975 |
| 16 | Untreated check | — | — | 763 |

It is also to be noted that few plants from all the treatments were uprooted to know the impact of fertilizer application in the rooting structure of the plant and it was measured treatment and replication wise.

The table indicates that application of Sulphur 55%+ $ZnSO_4$ 30% WG at 5500+990 grams per ha (Treatment 3) surprisingly proved to be highly effective as compared to Sulphur 90% WG at 6750 grams per ha (Treatment 13) and $ZnSO_4$ 33% at 4125 grams per ha (Treatment 14) used alone. It is to be noted that in the application of Sulphur 55%+$ZnSO_4$ 30% WG at 5500+990 grams per ha (Treatment 3) sulphur was reduced by 18% as compared to Sulphur 90% WG at 6750 grams per ha (Treatment 13) and zinc was reduced by 76% as compared to $ZnSO_4$ 33% at 4125 grams per ha (Treatment 14) thereby demonstrating a synergistic effect.

It was also observed that the application of Sulphur 60%+ ZnO 20% WG, having an average particle size of less than 1.1 microns, at 6000+1600 grams per ha (Treatment 7) proved to be highly effective, showed high yield and showed dispersibility greater than 90% when added in water in comparison to Sulphur 65%+ZnO 18% prior art pastilles at 13000+2880 grams per ha (Treatment 15) did not exhibit dispersibility in water and were observed to settle down when added to tanks containing water.

The other composition Sulphur 50%+$ZnSO_4$ 20%+ $MgSO_4$ 25% WG at 5000+660+750 grams per ha (Treatment 6) not only proved to be effective but also displayed an increase in the thickness and length with the secondary rooting on the primary roots (randomly 3 plants per treatment uprooted to know the role of fertilizer application on rooting).
Vegetative Growth:

A clear difference was observed in the height of the young plant after the 25th day of application of Sulphur 55%+ $ZnSO_4$ 30% WG at 5500+990 grams per ha (Treatment 3) followed by Sulphur 50%+$ZnSO_4$ 20%+$MgSO_4$ 25% WG at 5000+660+750 grams per ha (Treatment 6) as compared to Sulphur 90% WG at 6750 grams per ha (Treatment 13) and $ZnSO_4$ 33% at 4125 grams per ha (Treatment 14) used alone.

It is to be noted that the opened leaf lamina in leaves was noticed with the application of Sulphur 50%+ZnSO4 20%+ MgSO4 25% WG at 5000+660+750 grams per ha (Treatment 6). A similar trend of changes was also noticed in the reproductive phase of the plant with a larger proportion of flowering and fruiting were observed in the same treatments.

The combination of sulphur and Zinc sulphate or zinc oxide in the composition also demonstrated various other benefits such as residual effect, high yield, improvement in deficiency in leaves, high impact on the growth and development of roots and shoots of the plant as compared to the observation of Sulphur 90% WG at 6750 grams per ha (Treatment 13) and $ZnSO_4$ 33% at 4125 grams per ha (Treatment 14) used alone.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

I claim:

1. A water dispersible granular composition comprising sulphur in the range of 30% to 85%, zinc sulphate monohydrate in the range from 8% to 60%, and at least one agrochemically acceptable excipient; wherein the composition comprises particles in the size range of 0.2 micron to 50 micron.

2. The water dispersible granular composition of claim 1, further comprising a micronutrient present in the range from 5% to 25% of the total granular composition.

3. The water dispersible granular composition of claim 1, wherein the micronutrient is selected from the group consisting of manganese sulphate, magnesium sulphate, and a combination thereof.

4. The water dispersible granular composition of claim 1, wherein the agrochemical excipient comprises at least one surfactant.

5. The water dispersible granular composition of claim 4, wherein the surfactant comprises a surfactant selected from the group consisting of sulfosuccinates, naphthalene sulfonates, sulfated esters, phosphate esters, sulfated alcohol, alkyl benzene sulfonates, polycarboxylates, naphthalene sulfonate condensates, phenol sulfonic acid condensates, lignosulfonates, methyl oleyl taurates, and polyvinyl alcohols.

6. The water dispersible granular composition of claim 1, wherein the particle size is in the range of 0.2 to 10 micron.

7. The water dispersible granular composition of claim 1, wherein the composition is in the form of microgranules, wherein the microgranules are in the size range of 0.1 mm to 0.5 mm, comprising particles in the size range of 0.2 to 50 micron.

8. The water dispersible granular composition of claim 1, wherein the composition is in the form of broadcast granules, wherein the broadcast granules are in the size range of 0.75 mm to 5 mm, comprising particles in the size range of 0.2 to 50 micron.

9. A fertilizer composition comprising sulphur in the range of 10% to 60% and zinc sulphate in the range of 5% to 25% or zinc oxide in the range of 3% to 25% and at least one agrochemically acceptable excipient in the form of a suspension concentrate, wherein the composition comprises particles in the size range of 0.1 micron to 50 micron.

10. The fertilizer composition of claim 9, wherein the particle size is in the range of 0.1 micron to 8 micron.

11. A fertilizer composition comprising sulphur in the range of 30% to 87%, zinc oxide in the range of 3% to 25% and at least one agrochemically acceptable excipient, in the form of microgranules or broadcast granules wherein the particle size is in the range of 0.1 microns to 50 microns.

12. The fertilizer composition of claim 11, wherein the composition is in the form of microgranules in the size range of 0.1 mm to 0.5 mm or broadcast granules in the size range of 0.75 mm to 5 mm.

13. A method of using the composition of claim 1, claim 9, or claim 11, comprising applying the composition through a micro irrigation system.

\* \* \* \* \*